(12) United States Patent
Yosha et al.

(10) Patent No.: US 10,635,170 B2
(45) Date of Patent: Apr. 28, 2020

(54) OPERATING DEVICE WITH EYE TRACKER UNIT AND METHOD FOR CALIBRATING AN EYE TRACKER UNIT OF AN OPERATING DEVICE

(71) Applicant: Volkswagen Aktiengesellschaft, Wolfsburg (DE)

(72) Inventors: Omer Yosha, Berlin (DE); Janine Perkuhn, Berlin (DE); Stefan Schulz, Berlin (DE); Christian Tendyck, Berlin (DE); Thomas Werner, Penzlin (DE); Thomas Schwarz, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/307,918

(22) PCT Filed: Jun. 6, 2017

(86) PCT No.: PCT/EP2017/063698
§ 371 (c)(1),
(2) Date: Dec. 6, 2018

(87) PCT Pub. No.: WO2017/211817
PCT Pub. Date: Dec. 14, 2017

(65) Prior Publication Data
US 2019/0265788 A1 Aug. 29, 2019

(30) Foreign Application Priority Data

Jun. 10, 2016 (DE) .................. 10 2016 210 288

(51) Int. Cl.
*G06F 3/01* (2006.01)
*G02B 27/00* (2006.01)
(Continued)

(52) U.S. Cl.
CPC .............. *G06F 3/013* (2013.01); *B60K 35/00* (2013.01); *G02B 27/0093* (2013.01);
(Continued)

(58) Field of Classification Search
None
See application file for complete search history.

(56) References Cited

U.S. PATENT DOCUMENTS

| 7,657,062 | B2 | 2/2010 | Pilu | .............................. 382/103 |
| 10,176,396 | B2 * | 1/2019 | Smyth | .................. G06K 9/3233 |

(Continued)

FOREIGN PATENT DOCUMENTS

| DE | 102015204281 A1 | 9/1916 | ............... G06K 9/62 |
| DE | 102013019117 A1 | 5/2015 | ............. G01B 11/26 |

(Continued)

OTHER PUBLICATIONS

Perra, David et al., "Adaptive Eye-Camera Calibration for Head-Worn Devices," IEEE Conference on Computer Vision and Pattern Recognition, pp. 4146-4155, 2015.

(Continued)

*Primary Examiner* — Christopher G Findley
(74) *Attorney, Agent, or Firm* — Slayden Grubert Beard PLLC (57) ABSTRACT

The invention relates to a method for calibrating an eye tracker unit of an operating device, wherein at least one apparatus is controlled by means of the operating device depending on at least one user input and wherein, in the case of the method, at least one graphical element is displayed respectively by a control unit of the operating device in at least one predetermined usage step of the operating device and at least one piece of viewing direction information is determined by means of the eye tracker unit for the user viewing a screen. The invention provides that, from the at (Continued)

least one displayed element, an optically salient element, on which the user must focus with their eyes in order to successfully perform the usage step, is established, and calibration data for the calibration of the eye tracker unit is generated depending on a display position of the optically salient element on the screen and depending on the at least one piece of viewing direction information.

15 Claims, 3 Drawing Sheets

(51) Int. Cl.
    *G02B 27/01*     (2006.01)
    *G06K 9/00*     (2006.01)
    *B60K 35/00*     (2006.01)

(52) U.S. Cl.
    CPC ........... *G02B 27/01* (2013.01); *G02B 27/017* (2013.01); *G06F 3/011* (2013.01); *G06K 9/00221* (2013.01); *G06K 9/00597* (2013.01); *G06K 9/00845* (2013.01); *B60K 2370/122* (2019.05); *B60K 2370/141* (2019.05); *B60K 2370/149* (2019.05); *B60K 2370/736* (2019.05); *B60K 2370/744* (2019.05); *G02B 2027/0138* (2013.01); *G02B 2027/0187* (2013.01)

(56) References Cited

U.S. PATENT DOCUMENTS

| | | | | |
|---|---|---|---|---|
| 2005/0163344 | A1* | 7/2005 | Kayahara | G06K 9/00442 382/103 |
| 2010/0293460 | A1* | 11/2010 | Budelli | G06F 3/04842 715/702 |
| 2013/0084013 | A1* | 4/2013 | Tang | G06K 9/4671 382/195 |
| 2013/0148910 | A1* | 6/2013 | Fredembach | G06K 9/40 382/275 |
| 2014/0180619 | A1 | 6/2014 | Kaplan et al. | 702/94 |
| 2014/0191927 | A1 | 7/2014 | Cho | 345/8 |
| 2014/0226131 | A1 | 8/2014 | Lopez et al. | 351/210 |
| 2014/0320397 | A1 | 10/2014 | Hennessey et al. | 345/156 |
| 2014/0361996 | A1 | 12/2014 | Eden et al. | 345/173 |
| 2015/0092983 | A1 | 4/2015 | Nguyen et al. | 382/103 |
| 2015/0234461 | A1 | 8/2015 | Suzuki et al. | 345/156 |
| 2015/0278599 | A1 | 10/2015 | Zhang et al. | 348/78 |
| 2015/0302585 | A1 | 10/2015 | Vanblon et al. | 345/173 |
| 2015/0316981 | A1 | 11/2015 | Sellen et al. | 345/156 |
| 2015/0331485 | A1* | 11/2015 | Wilairat | G02B 27/0172 345/156 |
| 2016/0139665 | A1 | 5/2016 | Lopez et al. | 345/156 |
| 2016/0267336 | A1 | 9/2016 | Niem | 348/78 |
| 2016/0342205 | A1 | 11/2016 | Shigeta et al. | 345/156 |

FOREIGN PATENT DOCUMENTS

| | | | |
|---|---|---|---|
| DE | 102014008852 A1 | 12/2015 | A61B 3/113 |
| DE | 1120140063821 | 11/2016 | A61B 3/113 |
| EP | 2879018 A1 | 6/2015 | G06F 3/01 |
| FR | 2989874 A1 | 11/2013 | A61B 3/113 |
| WO | 2012/052061 A1 | 4/2012 | G06F 3/01 |
| WO | 2013/059940 A1 | 5/2013 | A61B 3/113 |
| WO | 2014/020323 A1 | 2/2014 | G06F 3/01 |
| WO | 2014/192001 A2 | 12/2014 | G06T 7/20 |
| WO | 2017/211817 A1 | 12/2017 | G02B 27/00 |

OTHER PUBLICATIONS

International Search Report and Written Opinion, Application No. PCT/EP2017/063698, 10 pages, Aug. 23, 2017.

* cited by examiner

OPERATING DEVICE WITH EYE TRACKER UNIT AND METHOD FOR CALIBRATING AN EYE TRACKER UNIT OF AN OPERATING DEVICE

CROSS-REFERENCE TO RELATED APPLICATIONS

This application claims priority to German Application No. 10 2016 210 288.5, filed with the German Patent and Trademark Office on Jun. 10, 2016, the contents of which application are hereby incorporated by reference in their entireties.

TECHNICAL FIELD

The invention concerns a method for calibrating an eye tracker unit of an operating device. By means of the operating device, at least one apparatus can be controlled depending on at least one user input. The invention also concerns a corresponding operating device for operating the at least one apparatus. The operating device is provided in particular for a motor vehicle.

BACKGROUND

A viewing direction of a user can be captured by means of an eye tracker unit. It can thus be recognized for example on which element on a screen a user is focused or which one they are looking at. Such an eye tracker unit is known for example from US 2015/0278599 A1. It is also described therein that the eye tracker unit must be calibrated so that the coordinates of the focal point focused or viewed on the screen can be correctly calculated from the viewing direction information of the eye tracker unit.

A method for calibrating an eye tracker unit of an operating device of a motor vehicle is known for example from DE 10 2014 008 852 A1. Accordingly, a user must view a screen while their eyes are filmed with an eye tracking system. Meanwhile, a graphical object, a cross for example, is displayed on the screen. It is assumed that the user focuses their eyes on this graphical object so that the coordinates of the focused area are known. The viewing direction information meanwhile identified by means of the eye tracking system can thus be mapped or transformed to the known coordinates.

It is known from WO 2014/020323 A1 to determine the point on a screen which a user is currently focusing on in that a mouse cursor is shown on the screen, which a user must operate with a computer mouse. When the user clicks a button on the computer mouse, it is assumed that they are looking at that moment at the mouse cursor on the screen. It is also assumed that the viewing direction information provided by the eye tracker unit matches the position of the mouse cursor at that moment.

In a technical paper by Perra et al. (David Perra, Rohit Kumar Gupta, Jan-Micheal Frahm, "Adaptive Eye-Camera Calibration for Head-Worn Devices," CVPR—IEEE Conference on Computer Vision and Pattern Recognition, 2015), it is described for a head-mounted camera how optically salient elements can be recognized in a camera image of surroundings, on which a user is focused with a high probability.

The user calibration of an eye tracker unit is normally performed in that a series of defined calibration points must be viewed by the user in sequence for a short period of time. During this time, the eye tracker unit detects the viewing direction of the user and generates corresponding viewing direction information. This information can be compared with the known coordinates of the calibration points in order to provide or generate calibration data in order to compensate for a difference.

This solution of an active calibration by representing defined calibration points takes time and prevents the user from immediately beginning the actual system interaction, i.e., the use of the operating device for operating the at least one apparatus.

SUMMARY

Thus a need exists to perform a calibration of an eye tracker unit of a user device with little time expenditure.

This object is solved by the subject matter of the independent claims. Embodiments are disclosed in the dependent claims, the following description, as well as the figures.

BRIEF DESCRIPTION OF THE DRAWINGS

The invention is explained in the following using exemplary embodiments. The drawings show in FIG. 1 a schematic representation of a motor vehicle with an embodiment of the operating device.

DESCRIPTION

In one exemplary aspect, a method for calibrating an eye tracker unit of an operating device is provided. By means of the operating device, at least one apparatus can be controlled depending on at least one user input. Through the calibration and in some embodiments, a transformation rule or assignment function is adjusted or aligned for assigning viewing direction information of the eye tracker unit, which is dependent on a current eye position or viewing direction of the user, to a coordinate of a screen (display). In the case of a calibrated eye tracker unit, said user input can thus occur via the viewing direction.

In the method of the present aspect, at least one graphical element is displayed respectively on the screen by a control unit of the operating device in at least one predetermined usage step of the operating device.

The usage step can for example ensure that the user performs a user input on the screen. Accordingly, a graphical operating element for receiving the at least one user input can be displayed for example as the graphical element for operating the at least one apparatus. The usage step may in some embodiments also consist additionally or alternatively in that the user captures or views displayed information. Accordingly, the at least one graphical element can also comprise at least one output element, which describes an apparatus state of the at least one apparatus, e.g. a current speed of a motor. Additionally or alternatively and in some embodiments, the usage step can be that information, for example media content, is displayed to the user. Such media content can be for example an image or a photo or a video.

Accordingly, the at least one graphical element can comprise at least one media element for displaying media content.

During the at least one usage step, at least one piece of viewing direction information is also determined or generated for the user viewing the screen by means of the eye tracker unit. In other words, the eye tracker unit describes where a gaze of the user is directed. Accordingly, viewing direction information can be for example coordinates of a viewing point determined by the eye tracker unit on the screen or a viewing direction vector.

For the calibration, information of the actually viewed area or the actually viewed spot, that is e.g. coordinates of a calibration point, also belongs to the determined viewing direction information. If the usage step that the user is currently performing on the operating device is known, it can generally be determined which graphical element the user is currently viewing, at least with a predetermined minimum probability. In the method according to the present aspect, the spot actually being viewed by the user is determined in that an optically conspicuous or clear or salient element is determined from the at least one displayed element, which meets a predetermined salience criterion and on which the user must focus with their eyes to successfully carry out the usage step. Whether a graphical element is salient can also depend on the graphical surroundings. In general, "optically salient" here means that it draws the gaze of the user to it because it offers a visual stimulus and/or is currently contextually significant and/or of interest to the user.

Depending on a display position of the optically salient element on the screen and depending on the at least one piece of viewing direction information, calibration data is then generated for the calibration of the eye tracker unit. If the viewing direction information is for example a vector or a coordinate, then the calibration data can provide for example a correction vector, with which the uncalibrated viewing direction information is combined in order to hereby obtain the calibrated or corrected viewing direction information. It can also be provided to calculate at least one parameter of a transformation, as is generally known from the prior art, in order to calculate the viewing direction information from sensor data of the eye tracker unit and to adjust it such that a difference between the at least one piece of viewing direction information on one hand and the display position of the optically salient element on the other hand is minimized.

The benefit of the method according to the present aspect is that the user can use the operating device in the at least one predetermined usage step and the necessary calibration data for the calibration of the eye tracker unit is generated in the meantime. The operating device is thus ready for immediate use.

Several further embodiments of the present aspect concern the salience criterion, i.e. the question of how the optically salient element can be determined from several displayed graphical elements.

It can thus be provided in some embodiments that several graphical elements are displayed, for example several output elements for describing different apparatus states or several media elements for example for describing the operating device within the framework of a tutorial. The several graphical elements may in some embodiments thereby displayed such that some are displayed intermittently unclear and/or shaded and/or only in shades of gray and only one single element is optically marked clear and/or unchanged bright and/or colored and/or by a marking element during the usage step and is thus shown in an optically salient manner. In that thus only one single graphical element is shown clear/bright/colored/marked and the other graphical element or the other graphical elements in contrast compared to a different representation are shown intermittently unclear/shaded/in shades of gray, it is assumed that the user considers the one element optically salient and focuses on it. The perceptual reflexes of the human are thus used to steer or pull their attention or focus or gaze to a predetermined graphical element.

Additionally or alternatively and in some embodiments, it can be provided in the case of several displayed graphical elements that these are displayed appearing in succession chronologically and/or one is currently displayed in a respective animation of its size and/or shape and/or position and/or location in a changing manner.

By having the graphical elements appear in succession, it is assumed that the respective last-appearing element is considered optically salient by the user and the user focuses on it. If a graphical element is animated, it also acts as optically salient. If its size is hereby changed, the area within which the user maintains their view focus can be controlled in a targeted manner. Thus, a shrinking or growing element can guide the user's focus in a targeted manner. By changing the position, a series of viewing direction information can be generated, which describe a path to a display area of the screen. If there isn't enough space to change the position, a movement or animation can also be achieved by changing the position of the graphical element, that is for example through rotation.

A further option for determining one optically salient element from several graphical elements consists in some embodiments in that it is determined which of the displayed elements have a greatest salience value determined according to the salience criterion, and the element with the largest salience value is established as the optically salient element. For determining a salience value, the following parameter can be determined for example for each graphical element: a number and/or length of contrast edges, along which a predetermined minimum contrast is present; a generally known measure for the color contrast present in the graphic element; a generally known measure for the color contrast between the graphical element and adjacent surroundings of the graphical element. The impact of the respective properties of a graphical element on the salience value can be determined through simple tests with test subjects in that for example several graphical elements, which differ from each other in the value of at least one parameter (e.g. contrast, shape), are arranged by the test subjects according to the perceived salience. Determining a salience value results in the advantage that an optically salient element made up of several displayed graphical elements can also be determined if there is no fixed flow of the usage step. This can be the case for example when viewing media content, such as e.g. images, photos or videos, if such media content is displayed by at least one media element and an optically salient element should be determined within the media content.

If the flow of the usage step is specified in some embodiments, i.e., a series of graphical elements to be operated or viewed is known, then the respective next graphical element to be operated and/or viewed can be respectively established in advance as the optically salient element, if it is detected or recognized for example that the preceding optically salient element was operated and/or viewed by the user. The next element is then optically salient because it is actively sought by the user's gaze.

In some embodiments, only one single graphical element is shown at a time, which is then established as the optically salient element. This is provided in particular for an embodiment in which only a single operating element is displayed for receiving a user input.

This can be provided for example if the user needs to log or sign into the operating device in a usage step and needs to move a cursor on a touchscreen with their finger for example.

In connection with a specified flow of a usage step, in which the user must focus on several graphical elements in succession, and in some embodiments, it is be recognized when the user is done viewing a certain graphical element and switches to the next graphical element. Even in a different case, even if only one single graphical element is displayed, the user fixes or focuses their gaze on the optically salient element from the start and/or not continuously or permanently. In order to determine the viewing direction information associated with the time frame of the fixation or focusing on the optically salient element, it is provided that a lingering of a gaze of the user within a focus area with a predetermined area size for more than a predetermined minimum duration is recognized by means of the at least one piece of viewing direction information of the eye tracker unit. If the viewing direction information generated by the eye tracker unit in succession changes so slightly that all coordinates of the viewing direction information lie within the focus area with a predetermined area size and if this state lasts for at least the predetermined minimum duration then the calibration data from the viewing direction information determined during the lingering is generated when this lingering is recognized. It can be assumed here that the user has focused on a graphical element.

This is based on the fact that the optically salient element was focused on. If only one signal graphical element is displayed, then this graphical element can be selected with a high probability. The displayed graphical element closest to the focus area can also be established as the optically salient element, which is a further embodiment of the salience criterion.

However, it can hereby also happen that the user views an object located next to the screen during the lingering. In order to ensure that even one element is focused on on the screen, the following embodiments can be provided. Based on predetermined start calibration data or initial calibration data or default calibration data, at least one piece of preliminarily calibrated viewing direction information can be calculated. Only at least one such piece of viewing direction information is used to generate the final configuration data, which correspond with coordinates which meet a predetermined plausibility criterion. It is hereby assumed that the default calibration data falls short of a predetermined maximum deviation and thus the coordinates generated by means of the default calibration data point to a point which has a distance less than a predetermined maximum distance from the point that is actually focused on the screen. It can then be provided for example in the described manner to select as the optically salient element the graphical element that lies closest to the coordinates.

The plausibility criterion can now indicate that the viewing direction information should not be used or are implausible if the distance determined based on the default calibration data for each displayed graphical element is greater than a predetermined minimum distance.

The viewing direction information determined during the lingering thus describes a scatter plot of several focused points. A single correction vector can then be generated or calculated from it as calibration data by means of a least-squares method or by means of a RANSAC algorithm in some embodiments.

If several instances of viewing direction information are received from the eye tracker unit, the plausibility criterion can include that in the case of a change and/or a movement of the optically salient element the coordinates of all viewing direction information recognized as plausible must match the relative position change, i.e., only corresponding viewing direction information is selected. Through the movement of the optically salient element, a relative position change results between the respective consecutive representations. Thus, for example, a sequence of at least two different optically salient elements can thus be shown, which have different positions on the screen. If the user's eyes track these optically salient elements, then only such viewing direction information is selected, which describes coordinates on the screen, which correspond relatively with the change between the optically salient elements, that is describe the same relative position change as results from the change of the optically salient element. If an individual optically salient element is moved, then only such viewing direction information is selected that describes coordinates on the screen, which correspond to the relative position change, i.e., the movement of the optically salient element, that is describe this movement. Of course, an offset can hereby result due to the lacking final calibration that can then be compensated for by means of the generated calibration data.

If the screen is the touchscreen and the user touches the screen, it can also be assumed with a high level of confidence that the user has directed their gaze at the touch point. If the at least one user input is recognized as a touch event by means of such a touchscreen, then and in some embodiments, upon the recognized touch event, the viewing direction information generated respectively before and/or during and/or after the touch event is used for the calibration data. Additionally or alternatively and in some embodiments, screen coordinates of the touched graphical element and/or touch coordinates of the touch event are taken as a basis to generate the calibration data. In other words, a respective target specification for the viewing direction or the focused area on the screen can be specified, i.e., a calibration point can be defined, directly from the touch event and its coordinates on the screen or respectively from the coordinates of the touched graphical element from the touch event. Furthermore, all viewing direction information connected with the touch event can be used, thus viewing direction information determined within a predetermined period of time or within a predetermined time duration before and/or after the touch event, as well as viewing direction information determined during the touch event.

In order to present in a targeted manner an optically salient element for receiving a touch event, a control panel for entering a button actuation, that is for example a button of a graphical user interface (GUI) and/or a keyboard for receiving a character string can be displayed in some embodiments. If this control panel is then touched, a touch event thus results and the respective coordinate of the control panel or of the respective button on the keyboard can thus be used to generate the calibration data.

A slider element can also be displayed as a graphical operating element for entering a swipe gesture in some embodiments. The swipe gesture takes place here along a movement line. Accordingly, several pieces of viewing direction information describing a movement progression along the movement line can be received and used to generate the calibration data. It is assumed that, when performing the swipe gesture on the screen, the user follows their finger or another input object, with which the swipe gesture was performed, with their eyes or with their gaze. The said plausibility criterion, for example, can then also be taken as a basis, which specifies that only viewing direction information corresponding with the movement or with the movement progression of the swipe gesture can be used.

It can be provided in connection with the display of a media element and in some embodiments that a video with a user guide for the operating device and/or the at least one apparatus is displayed as the media element. A tutorial for the operating device is thus displayed or presented. At at least one point in time, a graphical element momentarily displayed in the video and announced via an audio response and/or optically highlighted in the video is determined as the respective optically salient element in some embodiments. Thus, for example, if a speed indicator on an instrument panel of a motor vehicle is being explained, then it should be assumed that the gaze of the user is focused on a speed indicator displayed in the video.

The method can be provided for the generation of calibration data for an individual usage step or several usage steps in some embodiments. If several usage steps are performed in succession, then it can be provided that in each case calibration data is generated and the eye tracker unit is iteratively calibrated with the calibration data from each usage step, thus incrementally several times in succession. It is hereby prevented that the use of the eye tracker unit is not possible in the case of erroneously generated calibration data. It can be provided in some embodiments that a change in the calibration data iteratively adjusted in a usage step is kept below a predetermined maximum value, thus, the effect of the calibration data of an individual usage step is limited. It can also be achieved in some embodiments through iterative calibration that after a user change, the eye tracker unit is adjusted iteratively for the new user. It can also be provided in some embodiments that the operation of the operating device is initially blocked by means of the eye tracker unit and is only activated after a predetermined number of usage steps and thus calibration steps. As an alternative to a predetermined number of calibration steps, it can also be provided in some embodiments that a change in the calibration data resulting after a calibration step is determined and the operation is activated if the change from a calibration step is less than a predetermined maximum value. It can then be assumed that the eye tracker unit is tuned precisely enough for the user.

In order to perform the method described, an operating device according to a further aspect is provided for a motor vehicle, which has the eye tracker unit, the screen and a control unit. The control unit is set up to perform one or more embodiments of the method described in the preceding. For this, the control unit can have at least one microprocessor and/or at least one microcontroller. Furthermore, the control unit can have a program code, which is set up to perform the embodiment of the method according to the preceding description. The program code can be saved in a storage device of the control unit.

Further exemplary embodiments are described below.

In the following embodiments, the described components of the embodiment each represent individual features of the mentioned procedure, which may be considered independently of each other, i.e., as independent embodiments.

Furthermore, the following embodiments can also be combined with one or more of the embodiments, described in the preceding.

In the FIGS., functionally equal elements are respectively provided with the same reference numbers.

Figure 1:
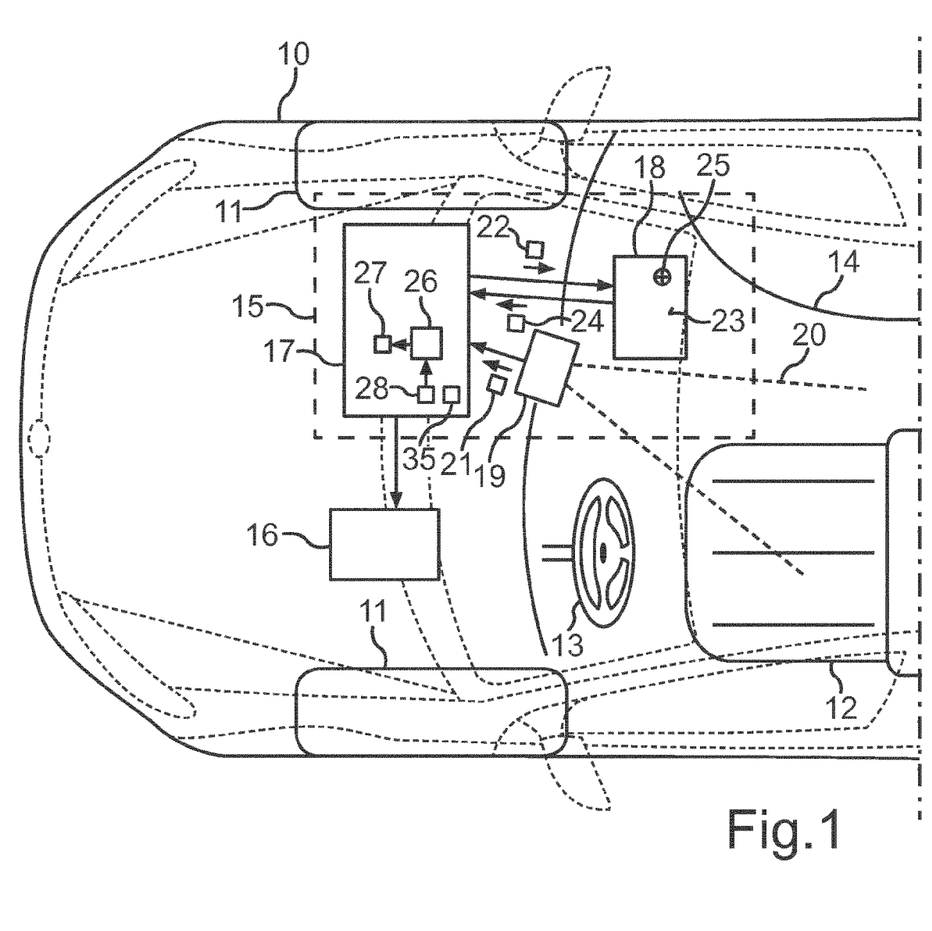

FIG. 1 shows a bird's-eye view of a partial view of a motor vehicle 10, which can be for example an automobile, in particular a passenger vehicle or a commercial vehicle. For orientation, front wheels 11, a driver seat 12, a steering wheel 13 and a center console 14 of the motor vehicle 10 are shown.

In the motor vehicle 10, an operating device 15 can be provided, by means of which at least one apparatus 16 of the motor vehicle 10 can be operated. The operating device 15 can be for example part of an infotainment system (information/entertainment system) of the motor vehicle 10. The at least one apparatus 16 can be for example a radio and/or a telephone and/or a navigation system and/or an air-conditioning system and/or a media playback device for video and/or audio files. The operating device 15 can have a control unit 17, a touchscreen 18 and an eye tracker unit 19. The touchscreen 18 represents a screen. The touchscreen 18 can be arranged for example in the center console 14 of the motor vehicle. A head-up display or a non-touch-sensitive display for example can also be provided instead of a touchscreen.

A capturing area 20 of the eye tracker unit 19 can be aligned with the driver seat 12 so that a viewing direction of a driver can be captured. The touchscreen 18 and the eye tracker unit 19 can each be designed in the manner known from the prior art. During operation, the eye tracker unit 19 can generate viewing direction information 21 and output it to the control unit 17. The control unit 17 can output graphical data 22 for guiding a piece of display content 23 to the touchscreen 18. Furthermore, the control unit 17 can receive touch data 24 from the touchscreen 18, which can describe coordinates of a touch event 25 on the touchscreen 18. A touch event 25 can be for example a touch of a display area of the touchscreen 18 by the finger of a user, for example the driver.

So that it can be recognized based on the viewing direction information 21 at which part or where in the display content 23 the gaze of the user is directed, a transformation or mapping 26 is provided by the control unit 17, which converts the viewing direction information 21 into coordinates 27, which describe the point of intersection of a viewing direction vector of the gaze of the user with the display content 23 in the display area of the touchscreen 18. For this, the transformation 26 must be adjusted by means of configuration data 28, as is generally known from the prior art. However, the calibration is not performed by the control unit 17 in a separate calibration method or calibration step, for which the user can use the operating device 18 for no other intended purpose. Instead, a usage step of the operating device 15 is also used to generate calibration data 28.

Figure 2:
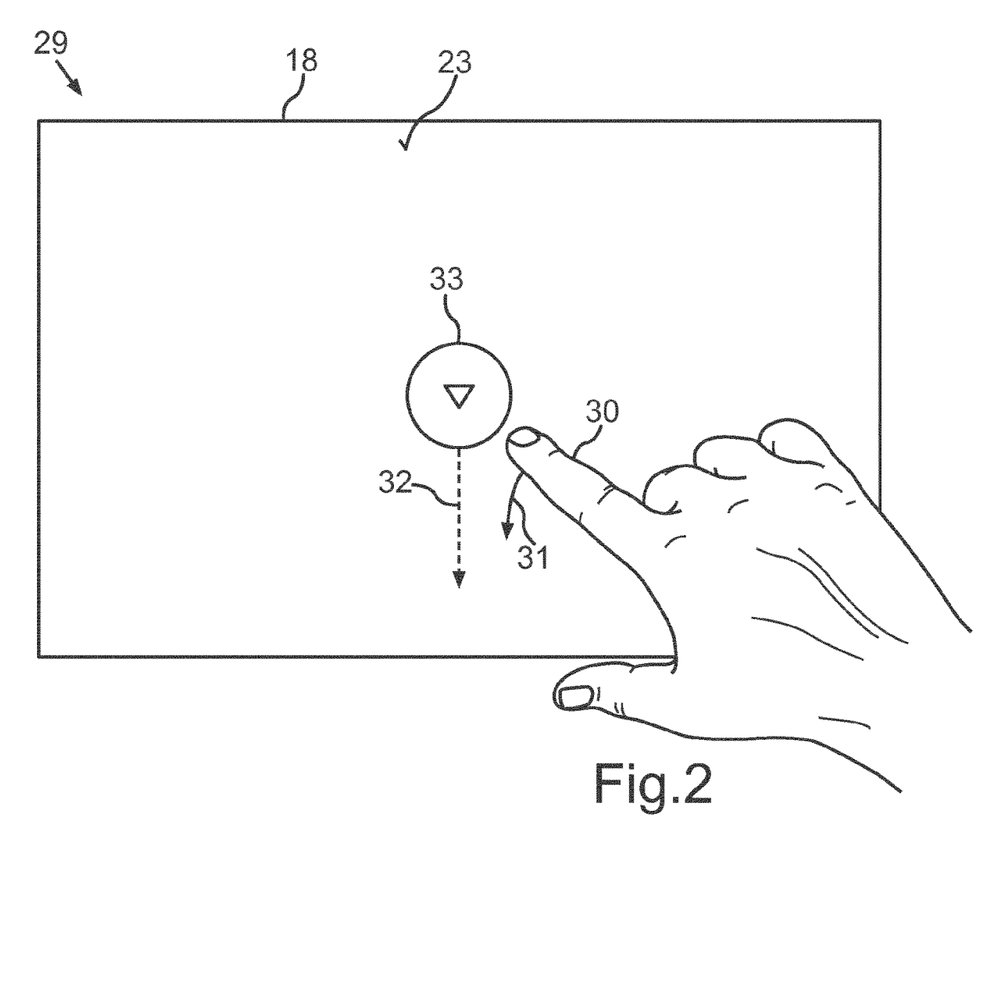
FIG. 2 a schematic representation of display content, which belongs to a usage step of the operating device and is used at the same time to generate calibration data according to an embodiment of the method according to the present invention.

In FIG. 2, this is shown by means of a usage step 29, which provides a so-called unlock, in the case of which the user must perform a swipe gesture 31 along a trajectory 32 on the touchscreen 18 using an operating object 30, for example their finger, in order to be able to view for example an operating menu of the operating device 15 on the touchscreen 18. For orientation, a graphical element 33 is displayed to the user on the touchscreen 18 by the control unit 17. The graphical element 33 is an operating element, which the user must touch with the operating object 30 and must drag along the trajectory 32. The user hereby implicitly performs the swipe gesture 31. It is thereby assumed that the user is also currently focusing their gaze on the performed movement. Hence, an adjustment is made between the focus actually recognized and signaled by the viewing direction information 21 and the estimated focus in the form of the position or coordinates of the element 33 on the touchscreen 18. In the same manner, certain control panels or buttons or sliders can be displayed to the user for actuation (not shown). It should also be assumed here that the user is focusing at the moment on the execution of the operating action on the respective interaction element, that is the graphical operating element. Based on this, an offset or respectively a deviation between the actual user focus (directed at the respective graphical element 33) and the viewing direction information 21 just determined by the eye tracker unit can be calculated technically and compensated for by means of the configuration data 28.

In general, this approach can refer to any graphical element of a graphical user interface (GUI). In an optimal use, only one single element is displayed on the screen (see FIG. 2).

If the operating device 15 recognizes the user focus based on a lingering of the viewing direction on a certain point or within a limited frame, the difference between the focus and the position of this element can be adjusted or compensated for directly and by means of the calibration data 28 under the assumption that the user is currently looking at a single displayed element.

The calculation and adjustment thereby take place based on the viewing points recognized shortly before and/or after a touch event 25. With the aid of mathematical processes, which are generally known from the prior art, these are then calibrated for the fixed position of the displayed graphical element.

In the case of the operating device, the calibration is thus hidden from the user and is performed without the user's knowledge while they perform certain operating steps or usage steps 29.

However, since it cannot be ruled out that the user occasionally looks outside of the desired and displayed area, the measured values are verified. The approach can be further optimized in that presented elements are first displayed very small and are then zoomed to a predetermined, final size. The operating of a slider even allows the analysis of the user focus along a clearly defined line or trajectory 32 (slider progression). This provides on the one hand more precise results, since the measured values first concentrate on a much smaller surface, and on the other hand also increases the probability that the user looks at the element 33 since more animation demands their attention.

Figure 3:
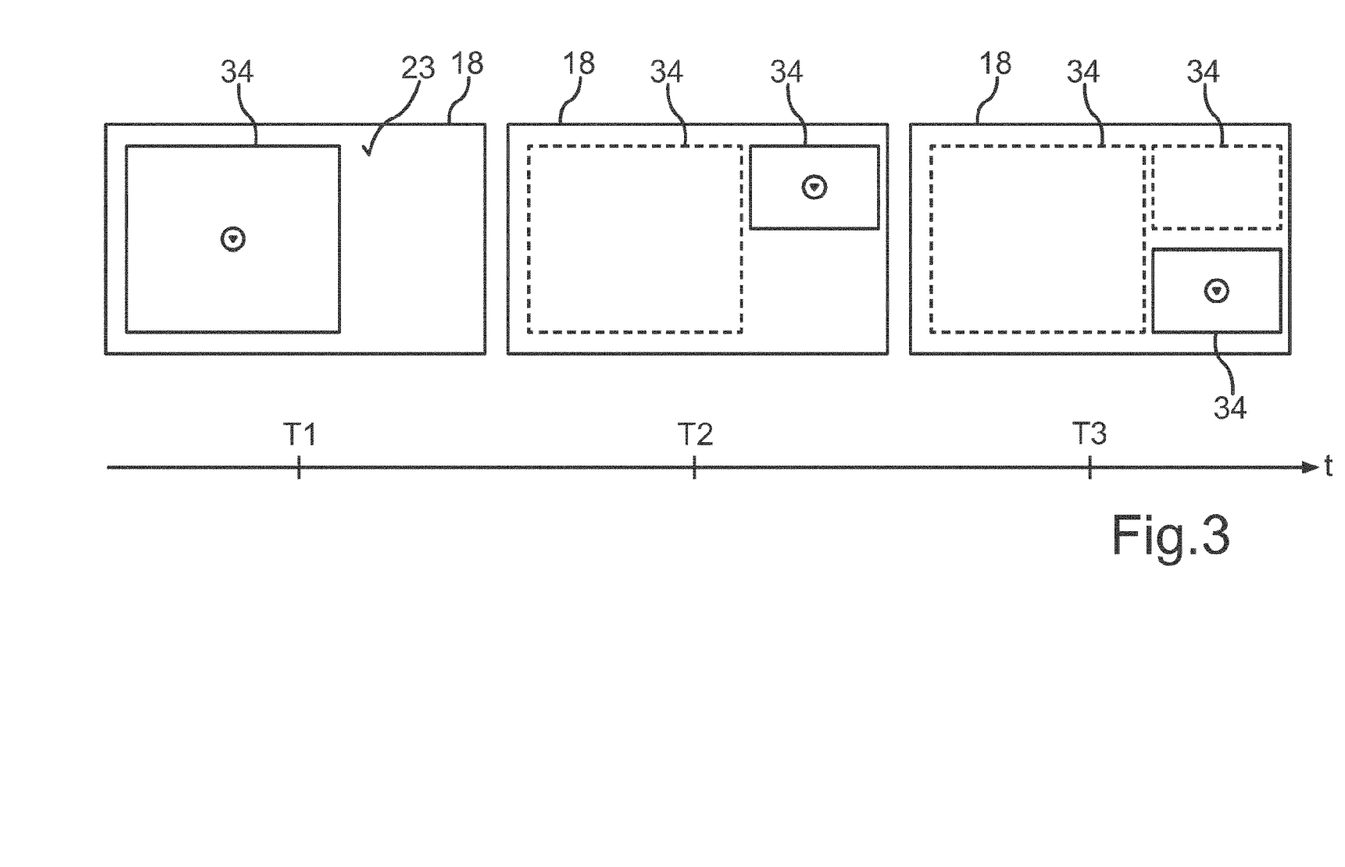
FIG. 3 a schematic representation of display content of a further usage step, which is used at the same time to generate calibration data according to a further embodiment of the method according to the present invention.

A further embodiment is shown in FIG. 3, in which the active calibration is hidden from the user and is performed without the user's knowledge. For this, FIG. 3 shows the display contents 23 of the touchscreen 18 over time t at three successive periods of time T1, T2, T3 respectively, while a video with a tutorial is maintained as a media element, which explains for example the target system to the user. This can be designed in any manner based on the use case. Thus, for example, a GUI application can be explained, which is based on a tile design. Upon the first system start, the user is first taken to the tutorial, in which the options for the operating device are presented to them. The GUI interface is not displayed at first, but rather built up gradually in periods of time T1, T2, T3. Tiles appear in any order and are presented acoustically with a couple of words. It is highly likely that the user will look at the respective new tile 34 as it appears. If measured values from the eye tracker unit are recorded as viewing direction information 21 during this period of time, then a default calibration or a standard calibration 35 can be adjusted based on this in connection with the tile position.

Since here it also cannot be ruled out that the user does not look at a tile from time to time, the measured values must also be verified. This is possible since, aided by the default calibration 35, while an absolute position of the gaze on the display content 23 of the GUI cannot be determined, relative positions with respect to each other can be. For example, if two presented tiles 34 were lying next to each other, then the recorded viewing data of the viewing direction information 21 would also need to lie next to each other. Implausible values can be discarded and disregarded in the calibration.

The presented approach can be further optimized in that presented tiles are first displayed very small and are then zoomed to the final size after a short period of time. This provides on the one hand more precise results, since the measured values first concentrate on a much smaller surface, and on the other hand also increases the probability that the user looks at the tiles since more animation demands their attention.

User distraction can also be reduced by hiding and/or darkening already presented tiles 34 and user attention can be directed to the currently presented tile. This is shown in FIG. 3 by a dashed representation of the tiles 34 already displayed at the preceding period of time T1, T2.

Instead of a completely empty display content 23 of the GUI upon system start, which gradually becomes populated, it can also be completely present from the beginning, but with darkened and/or blurred content. The currently presented tile would become highlighted and then darkened again.

While the operating device is running, calibrations and recalibrations can take place continuously without impacting the user's use of the program. For this, the viewed surface with the display content 23 can be analyzed and examined with respect to prominent points. This can either be performed automatically during operation or in advance during known representation of the display content 23. The user's attention will focus on the points determined in this manner during the program flow of the usage step (for example of the usage step 29 in FIG. 2). Over a defined period of time, viewing data is collected as viewing direction information 21 and interpreted as a scatter plot. A transformation is determined, which this scatter plot matches or maps in an error-minimizing manner to the previously determined points. This transformation can be used directly for the calibration correction of the default calibration 35 of the eye tracker unit. Furthermore, the calibration can be adjusted dynamically at runtime—if, for example, the structure changes or the user changes—since it proceeds continuously during the program use.

The operating device 15 thus avoids the active user calibration, which is generally found to be distracting. Furthermore, the eye tracker unit 19 is not just calibrated once at the beginning, which then no longer allows a setup or user change without a recalibration, but rather adjusts adaptively to changing conditions. The system can thus adjust itself adaptively when the user is changed.

A GUI typically contains areas that are frequently viewed by the user and on which the user also fixates for a period of time. This can be a button or a slider, for example. These features are defined as interest points and are identified in advance. During further progression, these points with their known display position are used as calibration points. As described above, the user operates the GUI as desired, not necessarily with their gaze, but rather for example also with an input object 30. During operation, viewing data is collected as viewing direction information 21 and, as described above, matched or mapped to the defined calibration points or interest points in order to correct the default calibration 35. For this, a least-squares method can be used or, for example, a RANSAC algorithm.

It is also possible to perform a calibration during the visualization of content, in which features or interest points cannot be extracted in advance, such as for example when viewing photos or videos. In this case, interest points would be extracted by means of image processing based on a salience criterion.

Overall, the examples shows how an automatic eye-tracking calibration can be provided.

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

REFERENCE LIST

10 Motor vehicle
11 Front wheels
12 Driver seat
13 Steering wheel
14 Center console
15 Operating device
16 Apparatus
17 Control unit
18 Touchscreen
19 Eye tracker unit
20 Capturing area
21 Viewing direction information
22 Graphical data
23 Display content
24 Touch data
25 Touch event
26 Transformation
27 Coordinates
28 Calibration data
29 Usage step
30 Input object
31 Swipe gesture
32 Trajectory
33 Element
34 Tile
35 Default calibration

What is claimed is:

1. A method for calibrating an eye tracker unit of an operating device, wherein by the operating device at least one apparatus can be controlled depending on at least one user input and wherein in the method by a control unit of the operating device in at least one predetermined usage step of the operating device respectively:
on a screen, at least one graphical operating element for receiving the at least one user input and/or at least one output element for describing an apparatus state of the at least one controlled apparatus and/or at least one media element for describing a situation is displayed, so that at least one graphical element is displayed during the usage step; and
at least one viewing direction information is determined for the user viewing the screen by the eye tracker unit, wherein
from the at least one displayed element, an optically salient element, which meets a predetermined salience criterion and on which the user must focus with their eyes in order to successfully perform the usage step, is determined, and calibration data for the calibration of the eye tracker unit is generated depending on a display position of the optically salient element on the screen and depending on the at least one viewing direction information, and wherein
a plurality of graphical elements are displayed, wherein
a first of the graphical elements is optically marked clear or unchanged bright or colored or by a marking element or a combination thereof during the usage step and is hereby shown in an optically salient manner to steer a user's focus to the first of the graphical elements; and wherein
all remaining graphical elements are displayed intermittently unclear or intermittently shaded or intermittently only in shades of gray or a combination thereof.

2. The method according to claim 1, wherein a plurality of graphical elements are displayed and these are displayed appearing in succession chronologically and/or one is currently displayed in a respective animation of its size and/or shape and/or position and/or location in a changing manner.

3. The method according to claim 1, wherein a plurality of graphical elements are displayed and it is determined which of the displayed elements have a highest salience value determined according to the salience criterion, and the element with the highest salience value is established as the optically salient element.

4. The method according to claim 1, wherein in the specified flow of a usage step, the respective graphical element to be operated and/or viewed next is established in advance as the optically salient element.

5. The method according to claim 1, wherein only one single graphical element, in particular an operating element for receiving the at least one user input, is displayed and established as the optically salient element.

6. The method according to claim 1, wherein based on the at least one viewing direction information a lingering of a gaze of the user within a focus area with a predetermined area size for more than a predetermined minimum duration is recognized and, upon recognition of the lingering, the calibration data is generated from viewing direction information which was determined during the lingering.

7. The method according to claim 1, wherein at least one preliminarily calibrated viewing direction information is calculated based on predetermined default calibration data and only at least one such viewing direction information is used for generating the calibration data, which correspond with coordinates, which fulfill a predetermined plausibility criterion.

8. The method according to claim 7, wherein multiple sets of viewing direction information are received, which comprise the plausibility criterion, wherein the coordinates of all selected viewing direction information correspond with the relative position change in the case of a change and/or a movement of the optically salient element.

9. The method according to claim 1, wherein the screen is designed as a touchscreen and the at least one user input is recognized as a touch event by the screen and in the case of a recognized touch event the viewing direction information generated respectively before and/or during and/or after the touch event and/or coordinates of the touched graphical element on the screen and/or touch coordinates of the touch event are taken as a basis to generate the calibration data.

10. The method according to claim 9, wherein a control panel for entering a button actuation and/or a keyboard for receiving a character string is displayed.

11. The method according to claim 9, wherein a slider element for entering a swipe gesture along a movement line is displayed as a graphical operating element and multiple sets of viewing direction information describing a movement progression along the movement line are received and used to generate the calibration data.

12. The method according to claim 1, wherein a video with a user guide for the operating device and/or the at least one apparatus is displayed as the media element and, at least one point in time, a graphical element momentarily displayed in the video and announced via an audio response and/or optically highlighted in the video is established as the respective optically salient element.

13. The method according to claim 1, wherein a plurality of usage steps are performed in succession and calibration data is respectively generated and the eye tracker unit is iteratively calibrated with the calibration data from each usage step.

14. The method according to claim 10, wherein a slider element for entering a swipe gesture along a movement line is displayed as a graphical operating element and multiple sets of viewing direction information describing a movement progression along the movement line are received and used to generate the calibration data.

15. An operating device for a motor vehicle, having an eye tracker unit, a screen and a control unit, configured to perform the method according to claim 1.

* * * * *